Jan. 10, 1956 W. E. R. PULMAN 2,730,371
OPERATING MECHANISM FOR CHUCKS, CLUTCHES AND LIKE DEVICES
Filed July 17, 1951 2 Sheets-Sheet 2

Inventor:
William Elias Reginald Pulman
By Hoopes, Leonard & Glenn
Attorneys

United States Patent Office 2,730,371
Patented Jan. 10, 1956

2,730,371

OPERATING MECHANISM FOR CHUCKS, CLUTCHES AND LIKE DEVICES

William Elias Reginald Pulman, Hove, England, assignor to C. V. A. Jigs, Moulds & Tools Limited, Hove, England, a British company Application July 17, 1951, Serial No. 237,238

Claims priority, application Great Britain July 17, 1950

5 Claims. (Cl. 279—50)

This invention relates to operating mechanism for chucks, clutches and like devices which require relative axial movement to be imparted between two of their members during the rotation of the device, and particularly to operating mechanism for collet chucks for machine tools.

Heretofore such collet chucks have been operated by means of toggle levers and variations in the diameter of the workpieces were compensated by the springiness of the levers. This resulted frequently in the fracture of the levers due to their being overstressed when gripping an oversize workpiece.

An object of the present invention is to provide operating mechanism which is not so liable to fracture.

According to this invention an operating mechanism for a chuck, clutch or the like comprises two operating members relatively movable along the axis of rotation, two abutment members moving and connected respectively therewith, which abutment members are provided with opposed faces concentric about said axis and so shaped as to provide between them a gap which increases in width as it extends outwardly, a number of balls disposed between said faces and of such a size that portions thereof extend beyond the peripheries of said abutments, an actuating sleeve encircling and engaging said balls and axially movable in relation to the abutments, the inner face of which actuating sleeve is so shaped that axial movement in one direction causes the balls to be forced radially inwards and spread the abutments apart, whereby relative axial movement is imparted to the aforesaid members, and means for imparting axial movement to said actuating sleeve.

Such an arrangement is particularly applicable to a collet chuck the fingers of which are formed with external conical faces encircled by a collet sleeve having an internal conical face, and which collet sleeve is encircled by a hollow spindle having a flange or the like at one end overhanging end faces of the collet fingers. In such an arrangement an external shoulder is provided on the hollow spindle at a distance away from the inner end of the collet sleeve and there are disposed adjacent said shoulder the two aforesaid abutment members, the abutment member further from the shoulder being arranged to engage one or more elements extending through and axially movable in holes in said spindle and contacting with the inner end of said collet sleeve or a member abutting it. An important feature of the invention consists in the provision of resilient means between the shoulder on the spindle and the adjacent abutmemt members.

For example, the resilient means may comprise a resilient dished washer.

The aforesaid shoulder on said spindle may be formed by a part which is adjustable along the length of the spindle whereby the stiffness of the aforesaid resilient means may be varied.

The aforesaid elements which extend through holes in the spindle may comprise balls.

Preferably, these balls are encircled by a ring which is sufficiently resilient to enable the balls to abut easily around the end face of said collet sleeve or the member engaging it.

The following is a description of operating mechanism embodying the present invention, for a collet chuck mounted in a spindle carried by the head stock of an automatic lathe, reference being made to the accompanying drawings in which.

Figure 1:
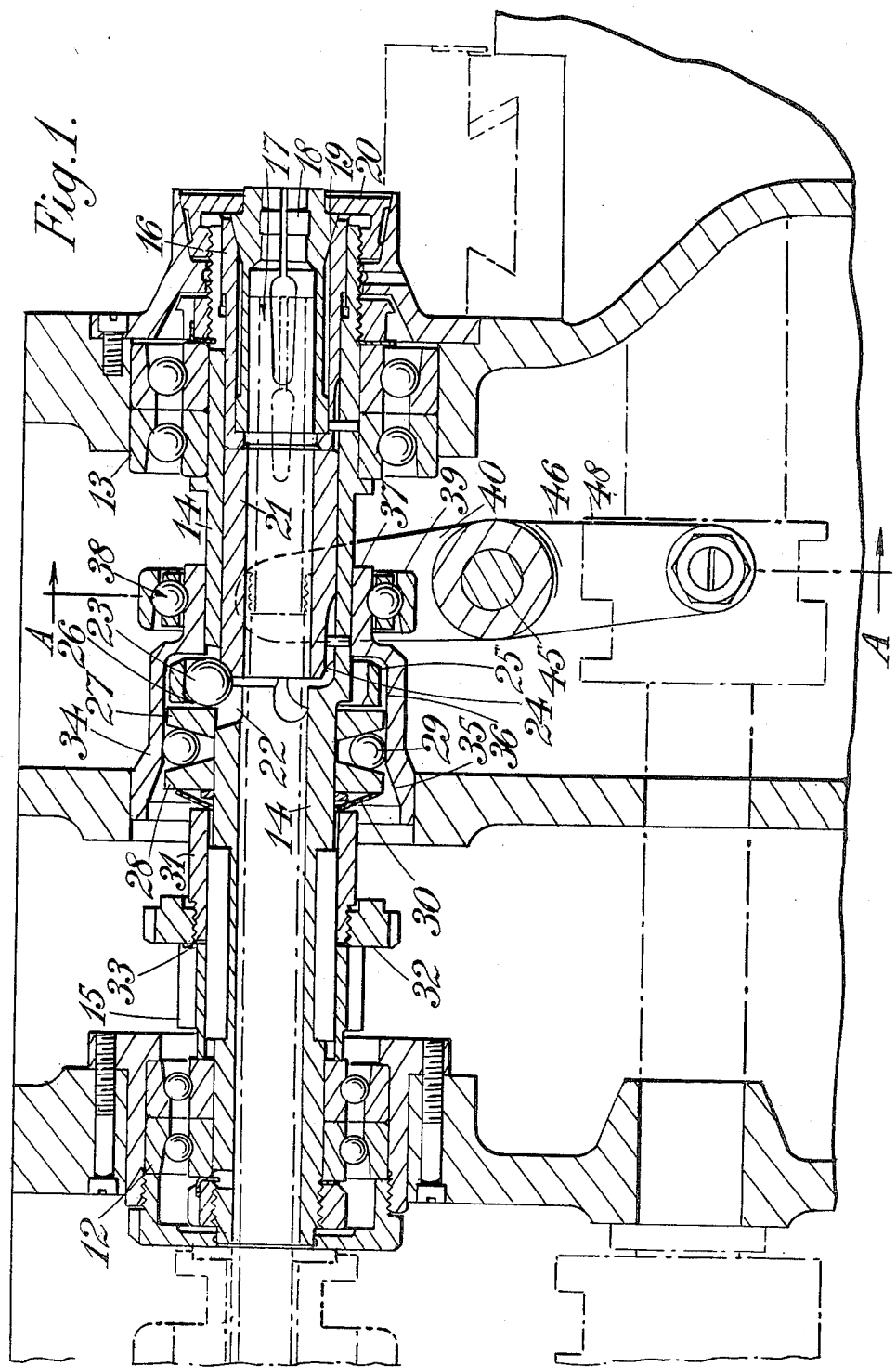
Figure 1 is a vertical sectional view of the spindle assembly.
Figure 2:
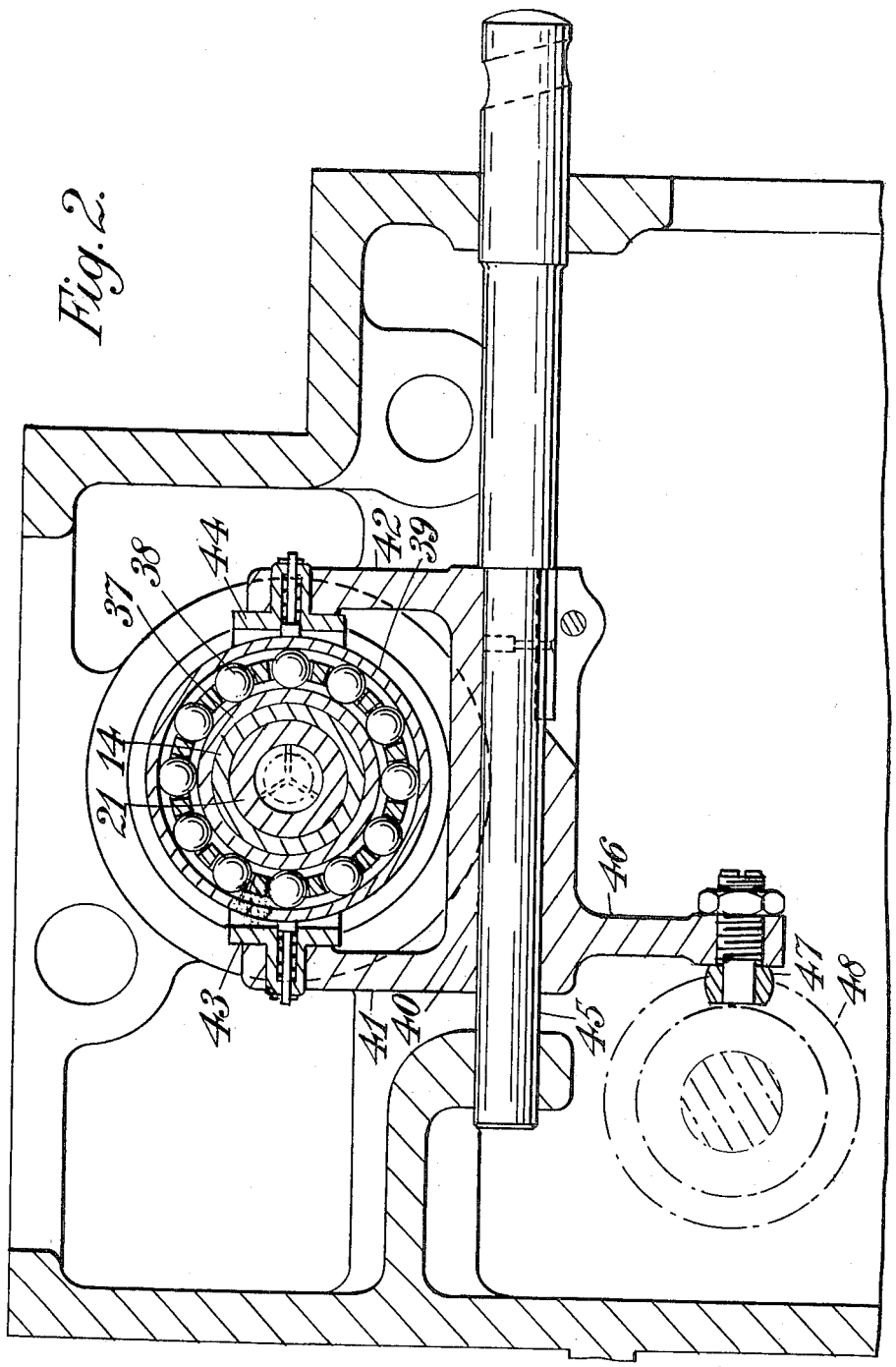
Figure 2 is a sectional view on line A—A of Figure 1.

As is usual, the head stock is provided with bearings 12, 13 for supporting opposite ends of the spindle 14. One end of the spindle 14 between the bearings 12, 13 has fixed to it a pinion 15 by means of which it is driven. The spindle 14 is hollow and is provided with increased external and internal diameters between the two bearings. Located within the larger diameter bore of the spindle 14 is a sleeve 16 encircling a collet 17, the fingers 18 of which are provided with external conical faces 19, which engage an internal conical face formed on said sleeve 16, which collet fingers 18 project beyond the end of the sleeve 16, and engage an internal flange formed on a cap member 20 secured to the spindle 14. A hollow abutment member 21 is also arranged in the wider bore of the spindle 14 and abuts the end of the collet sleeve 16. A number of holes 22 extend axially between the smaller and larger diameter portions of the spindle 14, in which holes 22 are located balls 23 which engage the end of the hollow abutment member 21 which is formed with a part toroidal race 24 around the periphery of its end face. The balls 23 are encircled by a ring 25 having an internal lip 26 on that side thereof remote from the hollow abutment member 21, but of such a size as to allow the peripheries of the balls 23 to project axially beyond the lip 26. Two annular abutment members 27, 28 encircle the spindle 14 having opposed conical faces between which are arranged a number of balls 29 of such a size as to project beyond the peripheries of the abutment members 27, 28. The abutment member 27 is arranged to rest against the first said balls 23, while the abutment member 28 is engaged by the outer periphery of a dished spring washer 30 which encircles the spindle 14. The inner edge of the spring washer 30 abuts against a shoulder formed at the end of a tubular element 31 which is keyed to the spindle 14. The other end of the tubular element 31 is externally threaded and is engaged by a nut 32 which abuts against a face of the aforesaid pinion 15 on the spindle 14. The nut 32 is provided with a projection 33 which may be engaged with a socket in the side face of the pinion 15, whereby the stiffness of the dished washer 30 after being adjusted may be maintained. The set of balls 29 is encircled by a cup-shaped member 34 having the open end thereof directed towards the aforesaid pinion 15, and provided with an internal conical face 35 at or near the open end and a cylindrical face 36 at the other end, the arrangement being such that when the cup-shaped member 34 is moved to a position in which the set of balls 29 is near the open mouth, the conical faced abutment members 27 may approach one another, thereby permitting the spring fingers 18 of the collet 17 to move outwardly, whereas when the cup-shaped member 34 is moved to a position in which the balls 29 are forced inwardly towards the spindle, the spring fingers 18 are forced inwardly by the sleeve 16 which surrounds them. If the fingers 18 grip the work before the balls 29 reach the cylindrical portion 36 of the cup-shaped member 34, then the dished spring washer 30 flexes and permits the further axial movement of the cup-shaped member 34 without unduly straining the collet fingers 18. The cup shaped-member 34 is provided with a hub portion 37 comprising the inner race of a ball race 38, the outer race 39 of which is straddled by a fork-shaped element 40 between the two limbs 41, 42 of which are pivotally mounted two pads 43, 44 which embrace the side faces of the outer race 39. The fork-shaped element 40 is mounted to rock on a shaft 45 arranged to pass transversely to the spindle 14 and is also provided with an arm 46 having a roller 47 mounted at the end thereof, which engages a drum cam 48, whereby the rotation of the drum cam 48 causes the fork-shaped member 40 to oscillate and by thus oscillating the aforesaid pads moves the outer race 39 of said ball race 38 axially in relation to the spindle 14 and thus impart axial movement to the cup-shaped member 34.

The drum cam 48 is mounted on the chucking cam shaft of the automatic lathe.

I claim:

1. In a chuck structure having a hollow spindle, a collet mounted within one end of the spindle and having resilient fingers, wedge means for causing radial movement of said fingers to engage the work, an axially movable transmitting member within said spindle for operating said wedge means, operating mechanism comprising a collar encircling said spindle and axially movable relatively thereto, a second collar encircling said spindle and held against substantial axial movement relatively thereto, said collars having opposed wedge faces whereby the gap between the collars increases in width as it extends outwardly, a plurality of balls disposed between said wedge faces, a cup member encircling said balls and having an internal cross-section which decreases in area in an axial direction, means for moving said cup member axially whereby its inner surface engages said balls and forces them radially inwardly between said wedge surfaces, thereby moving said movable collar away from said second collar, an axially-slotted portion of the spindle and a plurality of balls extending through the slots in said portion of the spindle and disposed between and engaging said movable collar and said transmitting member, whereby axial movement of the movable collar is transmitted to the transmitting member.

2. In a chuck structure as claimed in claim 1, a part-toroidal seating extending around the periphery of the end of the transmitting member, the last said balls resting in that seating.

3. In a chuck structure having a hollow spindle, a collet mounted within one end of the spindle and having resilient fingers, wedge means for causing radial movement of said fingers to engage the work, an axially movable transmitting member within said spindle for operating said wedge means, operaitng mechanism comprising a collar encircling said spindle and axially movable relatively thereto, a second collar encircling said spindle and held against substantial axial movement relatively thereto, said collars having opposed wedge faces whereby the gap between the collars increases in width as it extends outwardly, a plurality of balls disposed between said wedge faces, a cup member encircling said balls and having an internal cross-section which decreases in area in an axial direction, means for moving said cup member axially whereby its inner surface engages said balls and forces them radially inwardly between said wedge surfaces, thereby moving said movable collar away from said second collar, an axially-slotted portion of said spindle, a plurality of balls extending through the slots in said portion and disposed between and engaging said movable collar and said transmitting member, whereby axial movement of the movable collar is transmitted to the transmitting member, and resilient retaining means resiliently holding the last said balls in contact with the end of the transmitting member.

4. In a chuck structure as claimed in claim 3, resilient retaining means comprising a resilient ring encircling and engaging the last said balls and a part-toroidal seating extending around the periphery of the end of said transmitting member, the last said balls being held in that seating by the resilient ring.

5. In a chuck structure as claimed in claim 4, means holding said collet against axial displacement and a wedge member comprising part of said wedge means, which wedge member is axially movable by said transmitting member and co-operate with a wedge surface on the collet.

References Cited in the file of this patent

UNITED STATES PATENTS

| | | |
|---|---|---|
| 668,087 | Brown et al. | Feb. 12, 1901 |
| 814,647 | Hanson | Mar. 6, 1906 |
| 905,518 | Hanson | Dec. 1, 1908 |
| 1,163,386 | White | Dec. 7, 1915 |
| 2,040,601 | Dunn | May 12, 1936 |
| 2,310,259 | Ruppel | Feb. 9, 1943 |
| 2,338,060 | Redmer | Dec. 28, 1943 |
| 2,436,848 | Benjamin et al. | Mar. 2, 1948 |
| 2,467,569 | Walters | Apr. 19, 1949 |
| 2,475,519 | Robichaud | July 5, 1949 |